US012456812B1

(12) United States Patent
Cencich et al.

(10) Patent No.: US 12,456,812 B1
(45) Date of Patent: Oct. 28, 2025

(54) SINGLE ARM SPIRAL ANTENNAS

(71) Applicant: Lockheed Martin Corporation, Bethesda, MD (US)

(72) Inventors: Thomas Patrick Cencich, Littleton, CO (US); W. Neill Kefauver, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 309 days.

(21) Appl. No.: 18/157,809

(22) Filed: Jan. 20, 2023

Related U.S. Application Data

(63) Continuation of application No. 17/109,456, filed on Dec. 2, 2020, now Pat. No. 11,670,860.

(51) Int. Cl.
*H01Q 9/27* (2006.01)
*H01Q 1/14* (2006.01)
*H01Q 11/08* (2006.01)

(52) U.S. Cl.
CPC ................ *H01Q 9/27* (2013.01); *H01Q 1/14* (2013.01); *H01Q 11/08* (2013.01)

(58) Field of Classification Search
None
See application file for complete search history.

(56) References Cited

U.S. PATENT DOCUMENTS

| | | | | |
|---|---|---|---|---|
| 3,383,695 A * | 5/1968 | Jarek | H01Q 11/08 343/895 |
| 4,427,984 A * | 1/1984 | Anderson | H01Q 21/067 343/895 |
| 4,494,117 A * | 1/1985 | Coleman | H01Q 21/245 343/895 |
| 5,432,524 A * | 7/1995 | Sydor | H01Q 11/083 343/765 |
| 6,018,327 A | 1/2000 | Nakano et al. | |
| 6,844,862 B1 | 1/2005 | Cencich et al. | |
| 7,609,226 B1 | 10/2009 | MacGahan et al. | |
| 2001/0000604 A1 | 5/2001 | Qian et al. | |
| 2005/0146484 A1* | 7/2005 | Massey | H01Q 1/362 343/915 |
| 2009/0289868 A1 | 11/2009 | Granger | |
| 2015/0171517 A1* | 6/2015 | Grandfield | H01Q 3/28 342/368 |

OTHER PUBLICATIONS

Antenna-Theory.com, "Sprial Antennas," http://www.antenna-theory.com/antennas/travelling/spiral.php, 7 pages, 2015.

(Continued)

*Primary Examiner* — Dameon E Levi
*Assistant Examiner* — Anh N Ho

(57) ABSTRACT

Provided herein are various enhanced antenna structures for radio frequency communications. In one example, an antenna a spiral antenna element having a single arm configured to couple to a radio frequency link at a central node. The antenna also includes a ground element comprising a conical frustum sharing an axis at the central node of the spiral antenna element and configured to couple to a ground reference for the radio frequency link.

15 Claims, 6 Drawing Sheets

(56) References Cited

OTHER PUBLICATIONS

Nakano, Hisamatsu et al., "A Monofilar Spiral Antenna And Its Array Above A Ground Plane—Formation Of A Circularly Polarized Tilted Fan Beam," IEEE Transactions on Antennas and Propagation, vol. 45, No. 10, pp. 1506-1511, Oct. 1997.
Nakano, Hisamatsu et al., "A Monofilar Spiral Antenna Excited Through A Helical Wire," IEEE Transactions On Antennas and Propagation, vol. 51, No. 3, pp. 661-664, Mar. 2003.
WikipediA, "Spiral Antenna," https://en.wikipedia.org/wiki/Spiral_antenna, 3 pages, Aug. 7, 2020.

* cited by examiner

SINGLE ARM SPIRAL ANTENNAS

RELATED APPLICATIONS

This patent application is a continuation of, and claims priority to, U.S. patent application Ser. No. 17/109,456 that was filed on Dec. 2, 2020, and is entitled "SINGLE ARM SPIRAL ANTENNAS," which is hereby incorporated by reference into this patent application.

TECHNICAL BACKGROUND

Various antenna structures and types have been developed to transmit and receive radio frequency (RF) energy. Among these antenna types, spiral antennas have two or more antenna elements shaped into spirals, which might comprise spiral shapes selected from among Archimedean spirals, logarithmic spirals, square spirals, and star spirals. Spiral antennas can be used to transmit circularly polarized RF energy and receive linearly polarized RF energy. Conventional spiral antennas employ two or more spiral arms concurrently, where each spiral arm has an inner end and outer end. Spiral antenna theory states that there are N−1 useful broadband modes, where N is the number of spiral arms, so for a 2-arm spiral there is only 1 useful mode. Feed structures for two-arm spiral antennas also employ baluns or transformers in order to couple to coaxial cables. Baluns convert unbalanced lines to balanced lines, which are used to concurrently feed the two spiral structures. Some spiral antenna types comprise arrays of two or more spirals with an emission beam shifted off broadside. As frequency is changed on these spiral arrays, the emission beam will usually shift peak angles, thus making the antenna less desirable and useable by effectively reducing the antenna bandwidth.

OVERVIEW

Discussed herein are enhanced antennas and structures for forming antennas. Specifically, single-arm spiral antennas are provided. As mentioned above, spiral antenna theory states that there are N−1 useful broadband modes, where N is the number of spiral arms, so for a 1 arm spiral there would typically be 0 useful modes. However, the examples herein overcome such theoretical limitations and provide for a wideband single-arm spiral antenna. Advantageously, this enhanced single-arm spiral antenna does not require a balun or transformer for a feed line, and can be coupled directly to a coaxial link. The single-arm spiral antenna can be generally planar for bidirectional performance, may have a conic configurations for unidirectional performance, or might be formed onto a dielectric substrate (such as a printed circuit board) and fed from both ends of the spiral. However, in all of these example configurations, the enhanced single-arm spiral antennas operate over a wide frequency range and do not require special arrays or baluns to function.

Spiral shapes employed for the antennas herein have an inner end and outer end. RF energy is fed at the inner end of the spiral shape, fed by a center conductor of a coaxial link in many examples. Also included is a ground element positioned below the inner end of the spiral shape which couples to a coaxial shield conductor. Properties of this ground element can affect performance of the single-arm spiral antenna, such as when formed into a generally circular or conic shape having a selected height and width.

In one example, an antenna includes a single-arm spiral antenna having an antenna element configured to couple to a radio frequency link at a central node of the spiral. A ground element is disposed proximate to the central node of the spiral and configured to couple to a ground reference for the radio frequency link.

In another example, a system includes a transceiver configured to transmit or receive radio frequency energy over a coaxial link coupled to an antenna. The antenna comprises a spiral antenna element coupled at a central node to an inner conductor of the coaxial link, and a circular ground element disposed proximate to the central node of the spiral antenna element and coupled to a shield conductor of the coaxial link.

In yet another example, a method includes providing an antenna element formed into a spiral shape having an inner end and an outer end, the inner end corresponding to an antenna feed configured to couple to a center conductor of a coaxial link. The method also includes providing a ground element formed into a generally conic shape, positioned proximate to the antenna feed and separated from the antenna element by a selected spacing, wherein the conic ground element is configured to couple to a shield conductor of the coaxial link.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Discussed herein are enhanced antennas and structures for forming single-arm spiral antennas that transmit and receive radio frequency (RF) energy. Conventional spiral antenna theory states that there are N−1 useful broadband modes, where N is the number of spiral arms, so for a 1 arm spiral there would typically be 0 useful modes. However, the examples herein overcome such theoretical limitations and provide for a wideband single-arm spiral antenna. Advantageously, this enhanced single-arm spiral antenna does not require a balun or transformer for a feed line, and can be coupled directly to a coaxial link. The enhanced spiral antennas discussed herein reduces the cost, complexity, loss, and weight of a spiral antenna.

Figure 1:
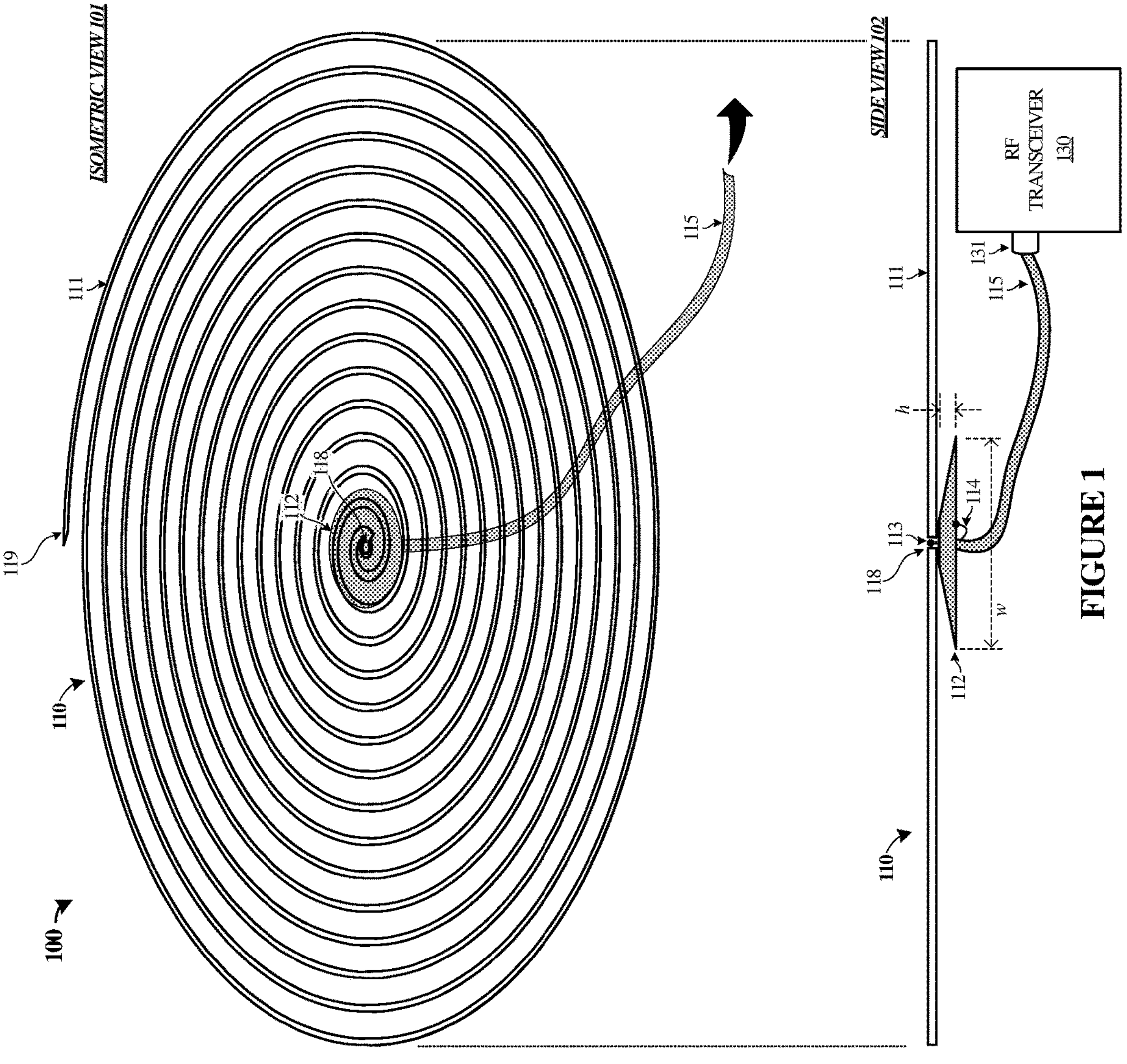
FIG. 1 illustrates an example planar spiral antenna in an implementation.

As a first example spiral antenna implementation, FIG. 1 is presented. FIG. 1 includes antenna system 100 which comprises antenna 110 illustrated in two views, isometric view 101 and side view 102. Also included in system 100 is exemplary transceiver 130 coupled to antenna 110 over coaxial link 115. Antenna 110 is comprised of one spiral antenna element 111 and ground element 112. Center conductor 113 of coaxial link 115 is shown coupled to spiral antenna element 111 and shield conductor 114 of coaxial link 115 is shown coupled to ground element 112. Connector 131 of RF transceiver 130 can be included to allow for coupling of coaxial link 115 to RF transceiver 130.

Spiral antenna element 111 comprises a generally planar Archimedean spiral in this example, also referred to as an arithmetic spiral, described in polar coordinates with the equation $r=a+b\theta$. Other spiral types can be employed, as mentioned herein. The thickness or width of the material forming spiral antenna element 111 can be selected based on particular strength requirements, as well as desired impedance or RF performance properties. The Archimedean spiral in this example corresponds to a constant conductor width and spacing of spiral antenna element 111. Although implementations can vary, this particular example has spiral antenna element 111 having a 2.1 inch diameter, has 15 turns, 25 mil arm width, and is fed by 0.047 inch diameter semirigid coaxial cable (50-ohms). Spiral antenna element 111 can be formed from a conductor or conductive material, such as a conductive wire, metallic tube structure, microstrip, stripline, printed conductive structure, etched conductive structure, or other similar structures and materials. Spiral antenna element 111 has inner node 118 and outer node 119. Inner node 118 is located within the spiral shape at the origin of the spiral, while outer node 119 is located at an outside edge of the spiral shape at the terminus of the spiral. Thus, spiral antenna element 111 has two ends, an inner end and an outer end. In FIG. 1, RF signals are introduced at inner node 118 using center conductor 113 of coaxial link 115.

In addition to spiral antenna element 111, ground element 112 is shown in FIG. 1. Ground element 112 has a generally conic shape in FIG. 1, which may include truncated top or flat top portions, and can be referred to as a hollow conical frustum. Ground element 112 has a height (h) and width (w) in FIG. 1, which can be selected based on desired properties or performance for antenna 110, such as frequency range and input impedance. In the example of FIG. 1, ground element 112 has a size of 0.3 inch. In some examples, such as when included on a printed circuit board or mounted to a dielectric substrate, ground element 112 might comprise a generally planar configuration forming a circle of material with a height corresponding to the thickness of the material used to form ground element 112. Ground element 112 comprises a conductive material, such as a metal or metallic compound, and is positioned proximate to inner node 118 of spiral antenna element 111, sharing a central axis with spiral antenna element 111. Ground element 112 might be formed from a disc or flat metallic element formed into a conical shape. An insulating spacing is provided between ground element 112 and spiral antenna element 111 to prevent conduction between ground element 112 and spiral antenna element 111. Dielectric materials can be employed between ground element 112 and spiral antenna element 111 to provide this spacing as well as to mechanically couple ground element 112 and spiral antenna element 111 together to form antenna 110. Shield conductor 114 of coaxial link 115 is coupled to ground element 112.

RF transceiver 130 includes various circuitry and elements configured to transmit and receive radio frequency (RF) energy over coaxial link 115 coupled to antenna 110. RF transceiver 130 comprises various power amplifiers, RF handling circuitry, signal mixers, modulators, demodulators, frequency references, and the like. In addition, various control circuitry or signal processing circuitry can be included, such as microprocessors, microcontrollers, programmable logic devices, discrete logic devices, integrated circuit devices, and other circuitry along with accompanying software or firmware.

Figure 2:
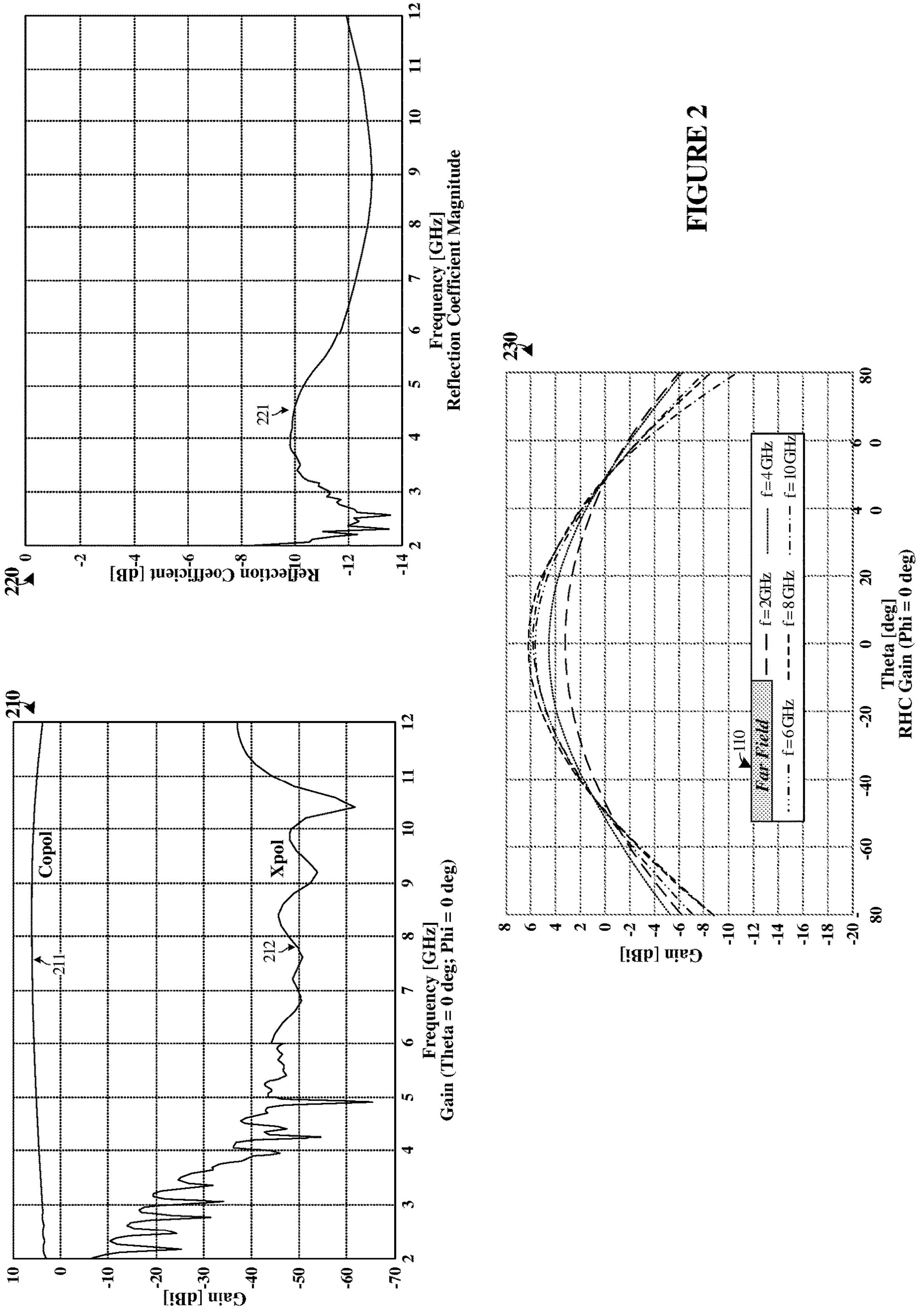
FIG. 2 illustrates an example performance of a planar spiral antenna in an implementation.

Turning now to various performance characteristics of antenna 110, FIG. 2 is presented. FIG. 2 includes three graphs 210, 220, and 230 each indicating different performance characteristics for antenna 110. In FIG. 1, spiral antenna element 111 lies generally in a plane and provides bidirectional response for RF energy on both sides of the plane. Emission of RF energy which is generally perpendicular to the plane is referred to as broadside emission. As is seen in graphs 210, 220, and 230, performance of antenna 110 corresponds to wideband performance across frequencies approximately in a range of 2-12 gigahertz (GHz) for broadside emission of RF energy without appreciable squint. The upper frequency is limited in part by the width/size of ground element 112.

Graph 210 illustrates gain versus frequency for two polarization configurations of antenna 110. A vertical axis of graph 210 corresponds to gain in decibels relative to isotropic (dBi). In this instance, dBi refers to a gain of antenna 110 relative to an idealized point-source antenna (isotropic radiator). A horizontal axis of graph 210 corresponds to frequency in gigahertz (GHz). A first plot 211 corresponds to co-polarization performance (copol), while a second plot 212 corresponds to boresight cross-polarization (xpol) performance. Copol refers to when transmitted and received RF signals are both the same plane, while xpol refers to when transmitted and received RF signals are separated by 90 degrees. As can be seen from graph 210, relative cross-polarization is less than −10 dB from 2-12 GHz. Boresight cross-polarization is better than −22 dB above 3 GHZ, with an average of −55 dB from 5 to 12 GHz.

Graph 220 illustrates impedance match versus frequency for antenna 110. A vertical axis corresponds to a value of reflection coefficient in decibels (dB), while a horizontal axis corresponds to frequency in GHz. Plot 221 corresponds to reflection coefficient magnitudes over frequency. As can be seen from graph 220, antenna 110 has an impedance match below −9.5 dB (VSWR<2:1) for all frequencies 2-12 GHz except for ~2.1 GHz. The impedance match is better than ~−8 dB above 2 GHZ.

Graph 230 illustrates squint performance of antenna 110 in terms of far-field right-hand circular polarized gain (RHC gain) in a series of plots each corresponding to a different frequency (f). Squint refers to an angle that an RF transmission can be offset from perpendicular to the plane of antenna 110 under varying conditions. In graph 230, the conditions correspond to frequency of the RF signal transmitted by antenna 110. A vertical axis of graph 230 corresponds to gain in decibels relative to isotropic (dBi). A horizontal axis of graph 230 corresponds to an angle (theta) in degrees. These plots show that the emission pattern for antenna 110 does not begin to significantly squint until at least 12 GHZ, and then by only ~10 degrees. Thus, based on 210, 220, and 230, the single-arm configuration of antenna 110 is shown to work well from 2 to 12 GHz with a decent match, low cross-polarization, and a beam that peaks very near broadside.

Thus, the frequency range of antenna 110 is approximately 2-12 GHZ. This range corresponds to a wideband behavior. The upper frequency of 12 GHz is limited in part by diameter of coaxial link 115 and ground element 112 that spiral antenna element 111 is fed against (e.g. RF ground). A thin (1-5 mils) dielectric substrate can be added to support spiral antenna element 111 without significant performance degradation. Advantageously, antenna 110 does not need a beamformer. Antenna 110 is a bidirectional radiator so the backlobe must be taken care of (absorbed or reflected) if a unidirectional beam is desired. A unidirectional configuration is described in FIG. 3. Radiation efficiency in mode 1 should be very high, above a threshold efficiency, to avoid significant higher order mode contamination. The single arm spiral has no mode rejection since the higher order modes are properly phased to radiate.

Figure 3:
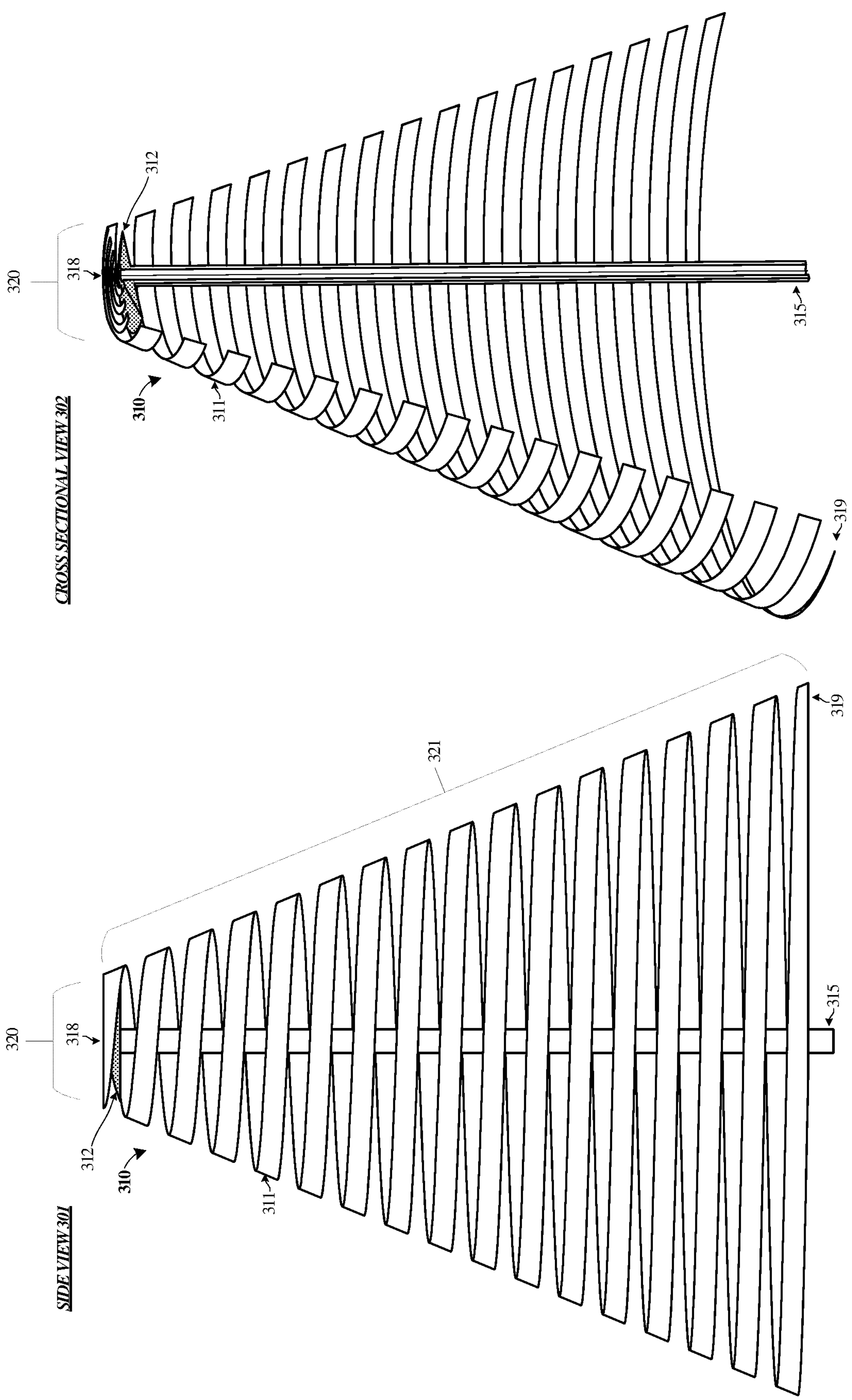
FIG. 3 illustrates an example conic spiral antenna in an implementation.

FIG. 3 illustrates an example conic spiral antenna arrangement in an implementation. The conic arrangement is illustrated in FIG. 3 as an alternative to the generally planar spiral antenna arrangement featured in FIG. 1. While the planar arrangement can provide for bidirectional response, the conical arrangement seen in FIG. 3 can increase efficiency in one hemisphere. This conical shape can increase transmission of radiation along the central axis of the cone, in the upward direction in FIG. 3.

Side view 301 and cross-sectional view 302 are shown in FIG. 3 of conic spiral antenna 310. Conic spiral antenna 310 has a single spiral arm 311 with an inner end 318 and outer end 319, and includes ground element 312. Coaxial link 315 is also shown in FIG. 3 which couples to elements of conic spiral antenna 310. A first portion of conic spiral antenna 310 comprises a generally planar spiral portion 320 coincident with ground element 312. Planar spiral portion 320 corresponds approximately to a width of ground element 312. Then, the remainder of conic spiral antenna 310 outside of the width of ground element 312 comprises conic spiral portion 321. Specifically, a second portion of conic spiral antenna 310 comprises an Archimedean spiral projected onto a cone which forms conic spiral portion 321. In this example, conic spiral antenna 310 is approximately 2 inches tall and 2 inches in diameter. The sizing of conic spiral antenna 310 can be selected based on desired frequency ranges, efficiency, and performance, among other factors.

Coaxial link 315 is shown rising vertically through the conic portion of conic spiral antenna 310 to reach inner end 318 of conic spiral antenna 310 where a center conductor of coaxial link 315 is coupled to inner end 318. As will be seen in FIG. 4, a short conductive feature can be provided as a transition element between the center conductor of coaxial link 315 and inner end 318. Conic spiral antenna 310 can be self-supporting, or may instead have a framework/support structure, dielectric substrate, or other configuration.

Figure 4:
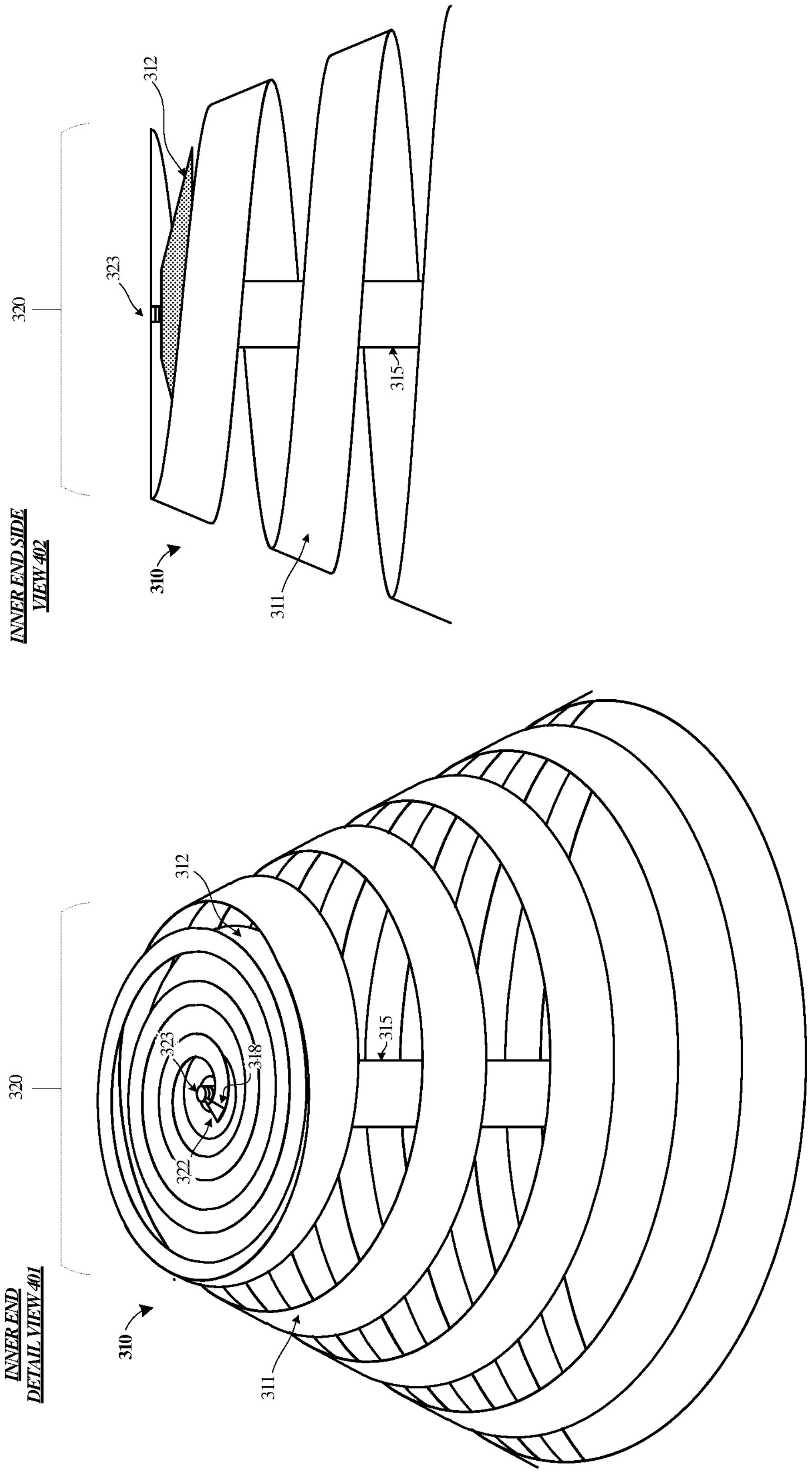
FIG. 4 illustrates an example conic spiral antenna in an implementation.

FIG. 4 includes two views, inner end detail view 401 and inner end side view 402. In view 401, a detailed view of planar spiral portion 320 is shown which illustrates the spiral configuration of the antenna arm, as well as the transition between center conductor 323 of coaxial link 315 and inner end 318. Specifically, transition element 322 is included which comprises a tapered microstrip of conductive material transitioning a width of center conductor 323 to a width of the material that forms inner end 318 of spiral arm 311. Moreover, a right-angle transition is made between center conductor 323 and inner end 318. transition element 322 comprises the "launch" portion of conic spiral antenna 310 where RF energy transitions from a conductive mode on coaxial link 315 to a radiative mode of conic spiral antenna 310. This launch in this example is accomplished by transitioning from coaxial link 315 to a microstrip (transition element 322), then transitioning the spiral shape away from ground element 312. The transition away from ground element 312 comprises planar spiral portion 320 proximate to ground element 312 which then transitions to conic spiral portion 321 outside of ground element 312.

Spiral arm 311 comprises two portions, as mentioned above. Planar spiral portion 320 has a first material thickness and spacing, and conic spiral portion 321 has a second material thickness and spacing. The thicknesses or widths of the material forming spiral arm 311 can be selected based on particular strength requirements, as well as desired impedance or RF performance properties. The Archimedean spiral of planar spiral portion 320 and conic spiral portion 321 in this example corresponds to a constant conductor width and spacing of spiral arm 311 within the respective portions. A transition in the material of spiral arm 311 between planar spiral portion 320 and conic spiral portion 321 comprises a tapered portion to establish a smooth shoulder from the generally planar arrangement to the generally conic arrangement. Spiral arm 311 is formed from a conductive material capable of transmitting and receiving RF energy. Spiral arm 311 can be formed from a conductor or conductive material, such as a conductive wire, metallic tube structure, microstrip, stripline, printed conductive structure, etched conductive structure, or other similar structures and materials.

Ground element 312 has a generally conic shape or hollow conical frustum, which may include truncated top portion on the top of ground element 312. Ground element 312 has a height (h) and width (w), which can be selected based on desired properties or performance for antenna 310, such as frequency range and input impedance. A cone diameter of 0.3 inch might be employed for ground element 312, similar to that found in FIG. 1, although other sizes can be employed. An example frequency range for antenna 310 might be 2 GHz to 12 GHz. At the low frequency end of 2 GHZ, a corresponding RF signal wavelength (λ) is about 6 inches. At the high frequency end of 12 GHz, a corresponding RF signal wavelength is about 1 inch. Ground element 312, when having a cone diameter of 0.3 inch, corresponds to λ/20 at the low end and λ/3 at the high end. Thus, the size of the cone diameter of ground element 312 might be selected to operate over a wavelength range of λ/3 to λ/20. Ground element 312 comprises a conductive material, such as a metal or metallic compound, and is positioned proximate to inner end 318 of spiral arm 311, sharing a central axis with antenna 310. An insulating spacing is provided between ground element 312 and spiral arm 311 to prevent conduction between ground element 312 and spiral arm 311. Dielectric materials can be employed between ground element 312 and spiral arm 311 to provide this spacing as well as to mechanically couple ground element 312 and spiral arm 311 together to form antenna 310. A shield conductor of coaxial link 315 is coupled to ground element 312.

Figure 5:
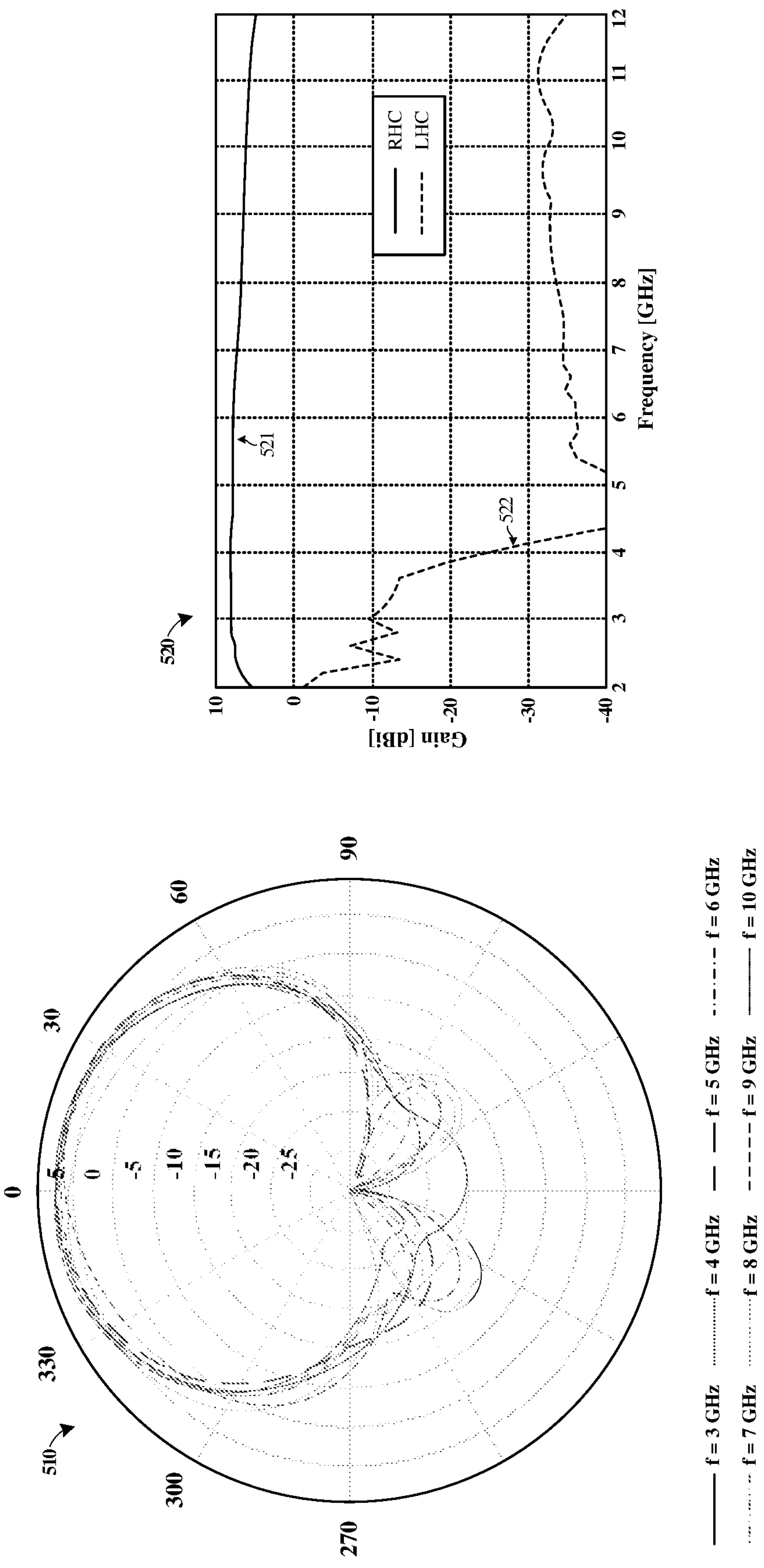
FIG. 5 illustrates an example performance of a conic spiral antenna in an implementation.

Turning now to various performance characteristics of antenna 310, FIG. 5 is presented. FIG. 5 includes two graphs 510 and 520 each indicating different performance characteristics for antenna 310. In FIG. 3, antenna 310 has a generally conic shape and provides unidirectional response for RF energy along a central axis of antenna 310. As is seen in graphs 510 and 520, performance of antenna 310 corresponds to wideband performance across frequencies approximately in a range of 2-12 gigahertz (GHz) for directional emission of RF energy without appreciable squint. The upper frequency is limited in part by the width/size of ground element 312. In graph 510, patterns and gain are shown from 3 to 10 GHZ (3.3:1 bandwidth). Antenna 310 exhibits frequency-independent behavior comprising similar gain and emission patterns at all frequencies shown. Emission patterns are well behaved up to 10 GHz where some asymmetry is exhibited. Graph 520 shows plots 521 (far-field right-hand circular polarized gain—RHC) and 522 (far-field left-hand circular polarized gain—LHC) that indicate cross-polarization is low above 3 GHZ. A vertical axis of graph 520 corresponds to gain in decibels relative to isotropic (dBi). A horizontal axis of graph 520 corresponds to frequency in GHz. The spiral match has a maximum of −5 dB in-band, and an average of less than −10 dB across the band. Antenna 310 thus has <−10 dB relative cross-polarization above ~2.2 GHZ.

Figure 6:
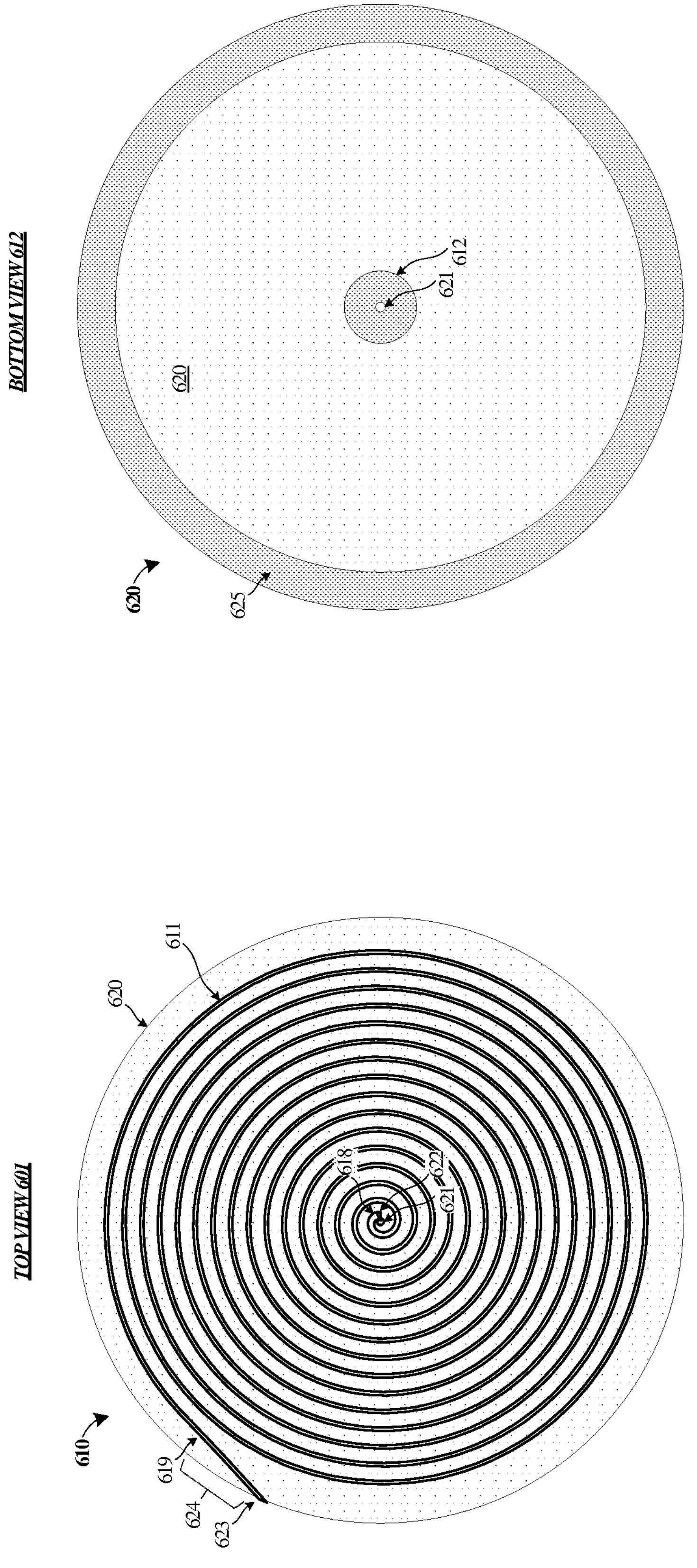
FIG. 6 illustrates an example planar spiral antenna with a dielectric substrate in an implementation.

FIG. 6 illustrates an example planar spiral antenna 610 with a dielectric substrate in an implementation. Top view 601 and bottom view 602 are included in FIG. 6. The planar arrangement of planar spiral antenna 610 can provide for bidirectional response. In contrast with the planar arrangement of FIG. 1, planar spiral antenna 610 has dielectric substrate 620 upon which a single spiral arm 611 is formed. Two ground elements 612 and 625 are included on an opposite side of substrate 620 as that of spiral arm 611. Moreover, planar spiral antenna 610 can be fed from both inner end 618 and outer end 619 to provide a dual-polarized one-arm spiral antenna arrangement. The sizing of elements of planar spiral antenna 610 can be selected based on desired frequency ranges, efficiency, and performance, among other factors.

Although an outside-fed mode can be employed with planar spiral antenna 610, this mode of operation is more narrow-band than desired. Also, this mode of operation radiates such that the bandwidth of planar spiral antenna 610 would be limited to about 2:1, with more practically the bandwidth being much less of about 1.5:1. In contrast to the outside-fed mode, an inside fed mode, such as the right circular polarization (RCP) mode shown in FIG. 6, has a very wide bandwidth of about 6:1. Therefore, the combination of the two modes, namely outside-fed mode and inside-fed mode, is only about 1.5:1 bandwidth. This dual-mode is referred to as simultaneous dual polarization.

Planar spiral antenna 610 comprises inner port 621 for a first coaxial link (not pictured) providing a center launch point for RF energy. Inner port 621 is coupled to microstrip element 622 which transitions from a center conductor of a coaxial link to spiral arm 611. Planar spiral antenna 610 comprises outer port 623 for a second coaxial link (not pictured) providing an outer launch point for RF energy. Outer port 623 is coupled to microstrip element 624 which transitions from outer port 623 to spiral arm 611. Inner port 621 and outer port 623 both can include connectors or couplers to connect to corresponding center conductors of coaxial links, or may instead be directly bonded to the center conductors via solder or welds. In operation, RF energy is fed to both inner port 621 and outer port 623 concurrently, with grounding provided by the associated ground elements 612 and 625. A shield conductor of the first coaxial link couples to ground element 612. A shield conductor of the second coaxial link couples to ground element 625.

In FIG. 6, the grounding elements are generally planar in configuration and do not comprise the conical structure found in prior examples. Ground element 612 comprises a disc or filled circular element having a central hole through which a center conductor of the corresponding coaxial link is routed. Ground element 612 is positioned below a central portion of spiral arm 611. Ground element 625 comprises a ring or annular ring outside of an outer portion of spiral arm 611. Ground element 625 is positioned generally below microstrip element 624, and may overlap with an outer portion of spiral arm 611. Ground element 612 and ground element 625 both can include connectors or couplers to connect to corresponding shield conductors of coaxial links, or may instead be directly bonded to the shield conductors via solder or welds.

Dielectric substrate 620 comprises a suitable material to provide electrical isolation and structural support to spiral arm 611 while providing physical separation between spiral arm 611 and ground element 612 and ground element 625. In some examples, substrate 620 comprises a printed circuit board or circuit board assembly having been formed from one or more layers of dielectric material. Other circuitry, such as input/output circuitry, transceiver circuitry, filters, modulators, or other circuitry can be mounted to a common circuit board or substrate as that of antenna 610. Materials for substrate 620 include polytetrafluoroethylene (Teflon), FR-4, FR-1, CEM-1 or CEM-3, among others.

Advantageously, the various examples herein provide for several implementations of single-arm spiral antennas with wideband frequency response. Moreover, these single-arm spiral antennas can be fed in an unbalanced configuration requiring no baluns or transformers to convert a coaxial link to a balanced link. Thus, a coaxial link can be directly coupled to the single-arm spiral antennas discussed herein. Moreover, when a generally planar single-arm spiral antenna is employed, broadside emission is provided for RF energy with no squint behavior over a large frequency range. In older styles of spiral antennas, such as arrays of spirals forming a beam, as RF frequency is changed, the beam will usually shift peak angles thus making the older styles of antenna less desirable or usable. This leads to the antenna bandwidth of the older styles of antenna being effectively reduced, as well as a beam shifted off broadside which is typically not desirable. In contrast, the examples herein of enhanced single arm spiral antennas provide a good excitation. This is accomplished by providing an antenna ground element near the antenna feed point, with a slowly changing geometry, such as the conical shapes discussed herein. The inside fed single-arm spiral antenna has bandwidth advantages over outside fed geometries. Since the lowest order mode is fed first, the bandwidth is limited only by its size and connector constraints.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes.

Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. An antenna, comprising:

a spiral antenna element having a single arm configured to couple to a radio frequency link at a central node;

a ground element comprising a conical frustum sharing an axis at the central node of the spiral antenna element and configured to couple to a ground reference for the radio frequency link; and wherein the single arm of the spiral antenna element comprises a planar portion beginning at the central node and extending approximately to a width of the ground element, and a conic portion outside of the width of the ground element, the conic portion corresponding to a spiral shape projected onto a cone extending away from the planar section.

2. The antenna of claim 1, comprising:

a dielectric material configured to electrically isolate and mechanically couple the spiral antenna element at the central node with respect to the ground element.

3. The antenna of claim 1, wherein the spiral antenna element is fed by a center conductor of a coaxial cable and the ground element is fed by a shield conductor of the coaxial cable.

4. The antenna of claim 3, wherein a connection between the coaxial cable and the spiral antenna element comprises an unbalanced configuration coupled without a balun or a transformer.

5. The antenna of claim 1, wherein the spiral antenna element provides unidirectional response for radio frequency energy corresponding to the axis.

6. The antenna of claim 1, comprising:

a microstrip transition element configured to transition from a coaxial link feeding the antenna to the spiral antenna element.

7. The antenna of claim 1, wherein at least height and width dimensions of the conical frustum are selected to provide a desired frequency range and a desired input impedance for the antenna.

8. The antenna of claim 1, wherein performance of the antenna corresponds to wideband performance across frequencies approximately in a range of 2-12 gigahertz (GHz) for broadside emission of radio frequency energy and squint under approximately 10 degrees for the range.

9. A system, comprising:

a coaxial link coupled to an antenna and configured to carry radio frequency (RF) energy;

the antenna comprising:

a spiral antenna element having a single arm and coupled at a central node to an inner conductor of the coaxial link;

a ground element shaped as a conical frustum and disposed proximate to the central node of the spiral antenna element, the ground element coupled to a shield conductor of the coaxial link; and wherein the single arm of the spiral antenna element comprises a planar portion beginning at the central node and extending approximately to a width of the ground element, and a conic portion outside of the width of the ground element, the conic portion corresponding to a spiral shape projected onto a cone extending away from the planar section.

10. The system of claim 9, wherein a connection between the coaxial cable and the antenna comprises an unbalanced configuration coupled without a balun or a transformer.

11. The system of claim 9, wherein the antenna provides unidirectional response for radio frequency energy corresponding to an axis of the conic portion.

12. The system of claim 9, comprising:

a microstrip transition element configured to transition from the coaxial link to the spiral antenna element.

13. The system of claim 9, comprising:

a dielectric substrate upon which the spiral antenna element is mounted, wherein the ground element is mounted having the dielectric substrate between the ground element and the spiral antenna element.

14. The system of claim 9, wherein height and width dimensions of the conical frustum are selected to provide a desired frequency range and a desired input impedance for the antenna.

15. A method, comprising:

providing an antenna element formed into a spiral shape having a single arm with an inner end and an outer end, the inner end corresponding to an antenna feed configured to couple to a center conductor of a coaxial link;

providing a ground element formed into a conical frustum shape and separated from the antenna element by a selected spacing, wherein the ground element shares an axis at a central node of the spiral antenna element and is configured to couple to a shield conductor of the coaxial link; and providing the antenna element with a planar portion beginning at the central node and extending approximately to a width of the ground element, and a conic portion outside of the width of the ground element, the conic portion corresponding to the spiral shape projected onto a cone extending away from the planar section.

* * * * *